United States Patent
Chen et al.

(10) Patent No.: US 6,602,064 B1
(45) Date of Patent: Aug. 5, 2003

(54) POLYMER PROCESSING SYSTEM AND APPARATUS

(75) Inventors: Ligin Chen, West Roxbury, MA (US); Kent Blizard, Ashland, MA (US); Roland Kim, Somerville, MA (US); Ted Burnham, Winchester, MA (US)

(73) Assignee: Trexel, Inc., Woburn, MA (US)

( * ) Notice: Subject to any disclaimer, the term of this patent is extended or adjusted under 35 U.S.C. 154(b) by 36 days.

(21) Appl. No.: 09/634,365

(22) Filed: Aug. 9, 2000

Related U.S. Application Data

(60) Provisional application No. 60/151,726, filed on Aug. 31, 1999.

(51) Int. Cl.$^7$ .............................................. B29C 44/50
(52) U.S. Cl. ..................... 425/4 C; 425/204; 425/208
(58) Field of Search ................. 425/4 C, 208, 425/204

(56) References Cited

U.S. PATENT DOCUMENTS

| | | | |
|---|---|---|---|
| 2,987,774 A | * 6/1961 | Jacobson | .................... 264/53 |
| 3,843,757 A | * 10/1974 | Ehrenfreund et al. | ......... 264/53 |
| 3,972,970 A | 8/1976 | Taylor | |
| 4,473,665 A | 9/1984 | Martini-Vvedensky et al. | |
| 4,521,541 A | * 6/1985 | Rutherford et al. | ........... 521/79 |
| 4,958,006 A | 9/1990 | Bernier et al. | |
| 5,158,986 A | 10/1992 | Cha et al. | |
| 5,160,674 A | 11/1992 | Colton et al. | |
| 5,334,356 A | 8/1994 | Baldwin et al. | |
| 5,762,840 A | 6/1998 | Tsai et al. | |
| 5,801,208 A | 9/1998 | Lee | |
| 5,866,053 A | 2/1999 | Park et al. | |
| 5,912,277 A | 6/1999 | Detterman | |
| 6,005,013 A | 12/1999 | Suh et al. | |
| 6,169,122 B1 | 1/2001 | Blizard et al. | |
| 6,231,942 B1 | 5/2001 | Blizard et al. | |
| 6,235,380 B1 | 5/2001 | Tupil et al. | |
| 6,284,810 B1 | 9/2001 | Burnham et al. | |
| 6,322,347 B1 | 11/2001 | Xu | |
| 6,376,059 B1 | 4/2002 | Anderson et al. | |

FOREIGN PATENT DOCUMENTS

| | | |
|---|---|---|
| DE | 195 44 858 A1 | 4/1997 |
| WO | WO 98/08667 | * 3/1998 |
| WO | WO 98/51467 | 11/1998 |
| WO | WO 99/32543 | 7/1999 |

* cited by examiner

*Primary Examiner*—Allan R. Kuhns
(74) *Attorney, Agent, or Firm*—Wolf, Greenfield & Sacks, P.C.

(57) ABSTRACT

The invention provides a counter-rotating extrusion system for processing foam material. The system is designed to introduce a physical blowing agent into the extruder, thoroughly disperse the blowing agent within the polymer melt and, preferably, to maintain relatively high pressures downstream from the point of blowing agent introduction. High quality polymeric foams, including microcellular foams, can be produced using the extrusion system. The system is particularly suitable for the production of foams using shear sensitive and degradable materials, such as PVC.

16 Claims, 2 Drawing Sheets

POLYMER PROCESSING SYSTEM AND APPARATUS

This application claims the benefit of Provisional Application 60/151,726, filed Aug. 31, 1999.

FIELD OF INVENTION

The present invention relates generally to a polymer processing system and apparatus and, more particularly, to a counter-rotating twin screw extrusion system for the production of polymeric foam.

BACKGROUND OF THE INVENTION

Polymeric foams include a plurality of voids, also called cells, in a polymer matrix. By replacing solid material with voids, polymeric foams use less raw material than solid plastics for a given volume. Thus, by using polymeric foams in certain applications instead of solid plastics, material costs may be reduced. It can be useful to characterize a foam by features of its cellular structure such as cell size, cell density, and the degree of cell interconnectivity. Microcellular foams (or microcellular materials) are a class of polymeric foams that have small cell sizes and high cell densities.

Polymeric foams can be produced using a number of known techniques. In an extrusion process, for example, foamed polymeric materials can be produced by introducing a physical blowing agent into a molten polymeric stream, mixing the blowing agent with the polymer, and extruding the mixture into the atmosphere while shaping the mixture. Exposure to atmospheric conditions causes the blowing agent to gasify, thereby forming cells in the polymer. Alternatively in the extrusion process, a chemical blowing agent can be added and caused to react in the molten polymeric stream, resulting in the generation of gas that forms cells in the polymer.

Counter-rotating twin screw extruders include two intermeshing screws that rotate in opposite directions, and are particularly useful for processing powders or polymeric materials that are susceptible to degradation, such as polyvinyl chloride (PVC). The counter-rotating screws have tight tolerances therebetween which promotes efficient downstream pumping of polymeric material with low shear forces and short residence times. Furthermore, typical counter-rotating screws reduce the tendency of polymeric material to recirculate, commonly referred to as leakage flow. degradation, they discourage the injection and uniform mixing of a physical blowing agent into the extruder, for example, as in certain foam processes. In particular, the low leakage flow limits the degree of mixing of the polymeric material in the extruder which may prevent proper dispersion of a physical blowing agent. Also, the low leakage flow makes it difficult to maintain pressure in the middle of the extruder, the typical point of blowing agent injection, which restricts the ability to quickly and uniformly dissolve the blowing agent in the polymeric material as needed in certain foam processes. Therefore, counter-rotating twin screw extrusion systems, to the applicants' knowledge, have not been used for foam processing with physical blowing agent injection.

Accordingly, a need exists for extrusion systems that can be used to process polymeric foams and, in particular, foams of materials that are shear sensitive and susceptible to degradation during processing, and that also can rapidly and thoroughly mix physical blowing agent with polymeric material in the extruder.

SUMMARY OF THE INVENTION

The present invention provides a counter-rotating twin screw extrusion system for processing foam material. The system is designed to introduce a physical blowing agent into the extruder, thoroughly disperse the blowing agent within the polymer melt and, preferably, to maintain relatively high pressures downstream from the point of blowing agent introduction. High quality polymeric foams, including microcellular foams, can be produced using the extrusion system.

In one embodiment, the invention provides a polymer processing apparatus. The apparatus includes an extruder having a barrel constructed to house a pair of twin polymer processing screws mounted therein. The extruder is constructed and arranged to drive the screws counter-rotationally and to convey polymeric material within a polymer processing space in a downstream direction. The apparatus further includes a blowing agent injection port fluidly communicating with the barrel and connectable to a source of blowing agent for introducing a blowing agent into the polymeric material in the polymer processing space.

In another embodiment, the invention provides a system. The system includes a pair of twin polymer processing screws constructed and arranged for counter-rotation within a barrel of a polymer processing apparatus. Each of the screws includes a blowing agent injection section positionable adjacent a blowing agent injection port in the barrel when the screws are mounted within the barrel.

In another embodiment, the invention provides a system. The system includes a pair of twin polymer processing screws constructed and arranged for counter-rotation within a barrel of a polymer processing apparatus. Each of the screws includes a mixing section positionable downstream of a blowing agent injection port in the barrel when the screws are mounted within the barrel.

In another embodiment, the invention provides a method. The method includes conveying polymeric material admixed with a blowing agent in a downstream direction in an extruder with counter-rotating screws.

Among other advantages, the invention provides a counter-rotating twin screw extruder into which a physical blowing agent can be introduced. The extruder, therefore, can be used to produce polymeric foams. The system utilizes the advantages of the counter-rotating screw configuration, such as efficient pumping with low shear and short residence times, thus making it particularly suitable for the production of foams using shear sensitive and degradable materials.

Furthermore, in certain embodiments, the extrusion system is configured to produce microcellular material. Microcellular materials have smaller cell sizes and higher cell densities than conventional polymeric foams. The unique cell structure of microcellular foams leads to several advantages over conventional foams including improved properties and appearance, amongst others.

As used herein, microcellular material, or microcellular foam, is defined as material having an average cell size of less than 100 microns or a cell density of less than $10^6$ cells/cm$^3$, and preferably both.

As used herein, cell density is the number of cells per cubic centimeter of unexpanded, solid plastic.

Unless otherwise defined, all technical and scientific terms used herein have the same meaning as commonly understood by one of ordinary skill in the art to which this invention belongs. Although systems and materials similar to those described herein can be used in the practice for testing of the present invention, suitable systems and materials are described below. All publications, patent applications, patents, and other references incorporated by reference herein are incorporated by reference in their entirety. In case of conflict, the present specification, including definitions, will control. In addition, the systems, materials, and examples are illustrative only, and not intended to be limiting.

Other advantages, novel features, and aspects will become apparent from the following detailed description when considered in conjunction with the accompanying figures and from the claims. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

The present invention provides an extrusion system for polymeric processing. The system includes counter-rotating twin screws and a system for introducing a physical blowing agent into the extruder. The extrusion system can be designed, as described further below, to insure adequate mixing of the blowing agent and polymer melt, as well as to maintain sufficient pressure in the extruder for the formation of a blowing agent and polymer solution. The extrusion system is useful in the production of polymeric foam material and, in particular, microcellular material.

Figure 1:
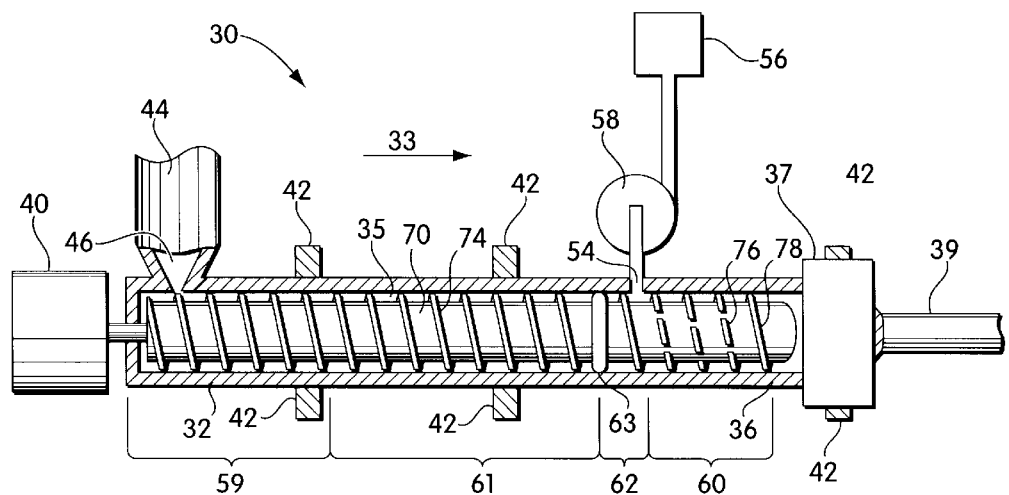
FIG. 1 schematically illustrates a counter-rotating twin screw extrusion system for the production of polymeric foam materials.
Figure 1A:
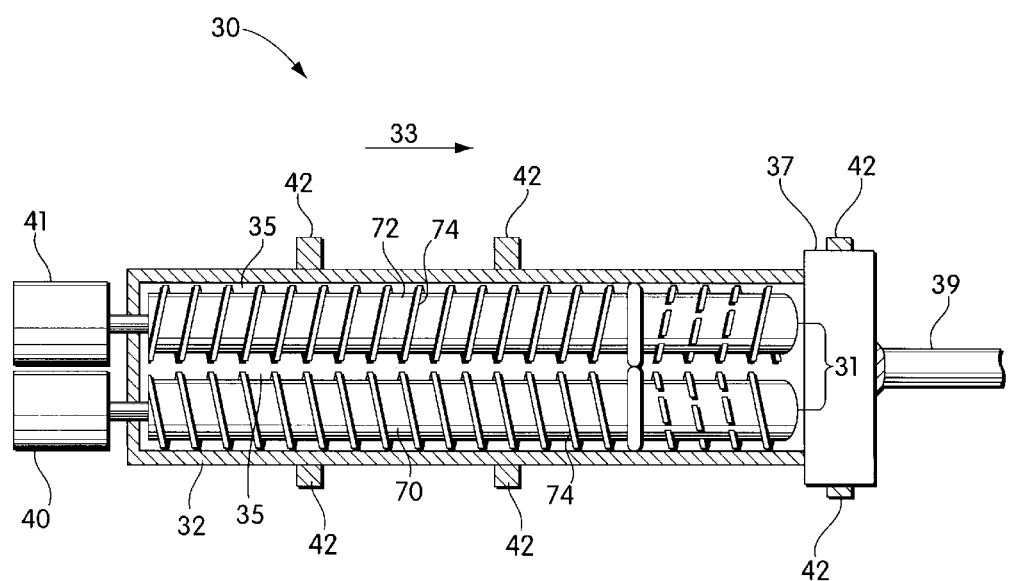
FIG. 1A is an overhead view of the counter-rotating screw assembly of the extrusion system illustrated in FIG. 1.
Figure 2:
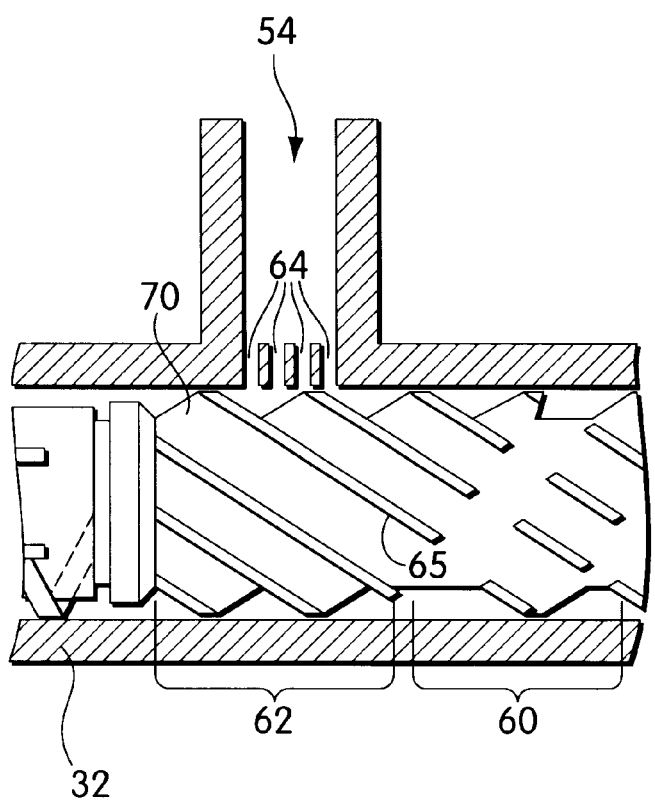
FIG. 2 schematically illustrates a multi-hole blowing agent feed orifice arrangement and extrusion screw.

In one illustrative embodiment of the invention as shown in FIGS. 1–2, an extrusion system 30 for the production of foam material includes a twin screw assembly 31 that counter-rotate within a barrel 32 to convey polymeric material in a downstream direction 33 within a processing space 35 defined between the screw assembly and the barrel. A blowing agent port 54 is provided within the barrel through which a physical blowing agent may be introduced into the polymeric material in the polymer processing space. As described further below, the screw assembly and the blowing agent injection port are designed to promote the formation of a well-mixed polymer and blowing agent mixture, preferably a single-phase polymer and blowing agent solution, within the processing space. The polymer and blowing agent mixture is extruded through a die 37 fluidly connected to the processing space and fixed to a downstream end of the barrel. The die includes internal passageways (not illustrated) to shape an extrudate 39 of polymeric foam.

The twin screw assembly includes a clockwise rotating screw 70 and a counterclockwise rotating screw 72 which are mounted so that flights 74 of the respective screws intermesh during rotation. Screws 70, 72 are operably connected at their upstream ends to respective drive motors 40, 41 which rotate the screws in the appropriate direction. The screws, along their length in a downstream direction, include coinciding feed sections 59, transition sections 61, blowing agent injection sections 62, and mixing sections 60. The screws may include other functional sections, known in the art, such as metering or cooling sections as required for particular processes. Preferably, the screws also may include a sealing section 63 upstream of the blowing agent injection section which restricts upstream flow of polymeric material and maintains sufficient pressure. The gas injection and mixing sections, as described further below, have particular designs which permits system 30 to produce polymeric foams.

Extrusion barrel 32 is constructed and arranged to receive a precursor of a fluid polymeric material. Typically, this involves a standard hopper 44 which contains pelletized polymeric material which is fed into the polymer processing space through an orifice 46 into the feed sections of the screws. In other embodiments, the precursor of polymeric material may be a powder which also can be introduced into the extruder using hopper 44. In other embodiments, the precursor can be a fluid prepolymeric material injected through an orifice and polymerized within the barrel via, for example, auxiliary polymerization agents. In connection with the present invention, it is important only that fluid stream of polymeric material is established within the system.

Any type of polymeric material can be processed using extrusion system 30, but the system is particularly suited for processing materials that easily degrade, as known in the art, such as PVC. Any number of additives or processing aids as known in the art, can be added to the polymeric material to facilitate the processing. Such additives can include filler, such as talc or calcium carbonate, lubricants, plasticizers, and the like.

Temperature control units 42 are positioned along extrusion barrel 32 to heat the barrel. Control units 42 can be electrical heaters, can include passageways for temperature control fluid, or the like, as is known in the art. Units 42 can be used to heat a stream of pelletized or fluid polymeric material within the extrusion barrel to facilitate melting and to cool the stream to control viscosity, skin formation and, in some cases, blowing agent solubility. The temperature controlling units can operate different at different locations along the barrel, that is, to heat at one or more locations, and to cool at one more different locations. Any number of temperature controlling units can be provided. The units may also be positioned on die 37.

Heat from the extrusion barrel 32 and shear force arising from the rotating screws, act to soften the pellets within the transition sections of the screw. Typically, a stream of fluid polymeric material is established upstream of blowing agent injection port 54.

The blowing agent is introduced into the polymer stream through the blowing agent port which is in fluid communication with a source 56 of a physical blowing agent. The port can be positioned to introduce the blowing agent at any of a variety of locations along the extrusion barrel 32. Preferably, as described further below, the port introduces blowing agent at the gas injection section of the screw, where the screw includes multiple flights.

Any of a wide variety of physical blowing agents known to those of ordinary skill in the art such as hydrocarbons, chlorofluorocarbons, atmospheric gases such as nitrogen or carbon dioxide, and the like can be used in connection with the system of the invention. In one preferred embodiment, source 56 provides carbon dioxide as a blowing agent. In another preferred embodiment, source 56 provides nitrogen as a blowing agent. In particularly preferred embodiments solely carbon dioxide or nitrogen is respectively used. Blowing agents that are in the supercritical fluid state in the extruder are especially preferred, in particular supercritical carbon dioxide and supercritical nitrogen.

A pressure and metering device 58 typically is provided between blowing agent source 56 and port 54. Device 58 can be used to meter the blowing agent, so as to control the amount of the blowing agent in the polymeric stream within the extruder to maintain a selected level of blowing agent. In a preferred embodiment, device 58 meters the mass flow rate of the blowing agent. Though the amount of blowing agent used depends upon the particular process, generally less than about 15% blowing agent by weight of polymeric stream and blowing agent is used. In some embodiments, blowing agent levels of less than 10%, or 5%, by weight of polymeric stream and blowing agent are used. In other embodiments, lower levels of blowing agent may be used such as less than 2%, or even less than 1%, by weight of polymeric stream and blowing agent.

The pressure and metering device can be connected to a controller (not shown) that also is connected to one of the drive motors 40, 41 and/or a drive mechanism of a gear pump (not shown) to control metering of blowing agent in relationship to flow of polymeric material to very precisely control the weight percent blowing agent in the fluid polymeric mixture.

Referring now to FIG. 2, a preferred embodiment of the blowing agent port is illustrated in greater detail, although it is to be understood that other blowing agent injection ports may be used in conjunction with this invention. In this preferred embodiment, port 54 is located at gas injection section 62 of the screws upstream the mixing section at a distance of no more than about 4 full flights, preferably no more than about 2 full flights, or no more than 1 full flight. Positioned as such, injected blowing agent is very rapidly and evenly mixed into a fluid polymeric stream to promote production of a polymer and blowing agent solution.

System 30 may include a single port or a plurality of ports arranged around the barrel. When a single port is used, it can be arranged at various positions around the barrel. As illustrated, the single port may be located in the barrel adjacent to one of the screws or, alternatively, at a point above the junction of the twin screw assembly. When multiple ports are utilized, typically, they are provided about the extruder barrel at various radial positions. For example, a plurality of ports 54 can be placed at the 12 o'clock, 3 o'clock, 6 o'clock, and 9 o'clock positions about the extruder barrel. In other embodiments, one or more ports may be positioned in the barrel adjacent to each screw.

Port 54, in the illustrated preferred embodiment, is a multi-hole port including a plurality of orifices 64 connecting the blowing agent source with the extruder barrel although, in other embodiments, port 54 may include a single orifice. In the multi-hole port embodiment, where each orifice 64 is considered a blowing agent orifice, the port may include at least about 2, in some cases at least about 4, in others at least about 10, in others at least about 40, in others at least about 100, in others at least about 300, in others at least about 500, and in still others at least about 700 blowing agent orifices.

As illustrated in FIG. 1, the counter-rotating screws preferably include blowing agent injection sections 62 that include full, unbroken flights 65 at the location of each blowing agent injection port. Typically, however, regardless of the position or number of the ports, both counter-rotating screws will include gas injection sections in the vicinity of the ports. However, in certain embodiments, a screw may include a blowing agent injection section only if a port is adjacent to that screw. That is, in embodiments in which a single port adjacent to one of the screws is utilized, only the screw adjacent to the port may include the blowing agent injection section.

Each flight in the gas injection section passes, or wipes, each orifice periodically, as the screw rotates. This wiping promotes rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. In this arrangement, at a standard screw revolution speed of about 30 rpm, each orifice is passed by a flight at a rate of at least about 0.5 passes per second, more preferably at least about 1 pass per second, more preferably at least about 1.5 passes per second, and more preferably still at least about 2 passes per second. In preferred embodiments, orifices 54 are positioned at a distance of from about 15 to about 30 barrel diameters from the beginning of the screw. The result is a distribution of relatively finely-divided, isolated regions of blowing agent in the fluid polymeric material immediately upon injection and prior to any mixing. The preferred design of the port and the gas injection section, thus, prevents the formation of large volumes of blowing agent in the polymer melt which would be difficult to disperse properly.

Referring again to FIG. 1, following the gas injection section, each screw includes respective mixing sections 60 having, at their upstream ends, slotted flights 76 with large gaps to break up the melt stream and to increase leakage flow. Both effects enhance mixing of the blowing agent and the polymer melt to promote the formation of a polymer and blowing agent solution. In preferred embodiments, the mixing is sufficient to form a single-phase solution of polymer and blowing agent within the extruder.

At the downstream end of the mixing section, the screws preferably include a section of full flights 78. The full flights reduce the leakage flow and build pressure in the polymer melt. The resulting high pressures increase the solubility of blowing agent in the polymer and promote the formation of the polymer and blowing agent solution. The high pressures also are, preferably, above the critical pressure required for the existence of a single-phase solution of polymer and blowing agent and, thus, a single-phase solution can be maintained in the extruder.

In preferred embodiments, the screw may also include sealing section 63 upstream of the blowing agent injection port for maintaining pressure in the polymer and blowing agent solution. The sealing section, typically, has a restriction element within the polymer processing space that limits backflow of polymeric material therepast. The restriction element can be any of the type, as known in the art, such as a ring, blister or a reverse screw flight.

Downstream of the twin screw assembly, polymer processing space 35 is fluidly connected to the internal passageways of the die. The shape and dimensions of the internal passageways can be configured, as known in the art, to produce the desired extrudate. For example, when producing microcellular material, as known in the art, the dies are designed with specific dimensions that result in sufficient pressure drops, pressure drop rates, and other factors. Preferred dies used in microcellular processing are described in international patent publication no. WO 98/08667, filed Aug. 26, 1997, by Burnham et. al., which is incorporated herein by reference.

As described above, the counter-rotating twin extrusion system can be used in the production of polymeric foams. The foams can be produced from any polymeric material, though the system is particularly useful for processing polymeric materials that are shear sensitive and susceptible to degradation. PVC-based foams are the preferred type of foam produced by the extrusion system.

Under appropriate processing conditions, the system can be used to produce microcellular materials having a variety of average cell-sizes, cell densities, and void fractions. Examples of microcellular materials that can be produced by the system are described in international patent publication no. WO 98/08667, filed Aug. 26, 1997, by Burnham et. al., which is incorporated herein by reference. For example, in some embodiments the microcellular materials can have an average cell size of less than 100 microns, in other embodiments less than 75 microns, in other embodiments less than 50 microns, in other embodiments less than 25 microns, and in other embodiments less than 10 microns. The microcellular material preferably has a maximum cell size of about 100 microns. In embodiments where particularly small cell size is desired, the material can have maximum cell size of about 50 microns, more preferably about 25 microns, more preferably about 15 microns, more preferably about 8 microns, and more preferably still about 5 microns. A set of embodiments includes all combinations of these noted average cell sizes and maximum cell sizes. For example, one embodiment in this set of embodiments includes microcellular material having an average cell size of less than about 25 microns with a maximum cell size of about 50 microns, and as another example an average cell size of less than about 10 microns with a maximum cell size of about 25 microns, etc. That is, microcellular material designed for a variety of purposes can be produced having a particular combination of average cell size and a maximum cell size preferable for that purpose.

The function and advantage of these and other embodiments of the present invention will be more fully understood from the example below. The following example is intended to illustrate the benefits of the present invention, but does not exemplify the full scope of the invention.

EXAMPLE

COUNTER-ROTATING TWIN SCREW EXTRUDER SYSTEM

A 70 mm IDE counter-rotating twin screw extruder was modified by lengthening the barrel 9.7 D to provide a 30:1 L/D ratio. Two blowing agent injection ports for introducing blowing agent were added on each side of the barrel. Each port included 175 orifices, each orifice having a diameter of 0.020 inch, for a total of 300 orifices. The injector ports were connected to a blowing agent pumping and metering system which controlled the flow of blowing agent to about 0.05 kg/hr. The barrel also included a vent port for venting volatiles.

Each counter-rotating screw was specially designed to include the following sections from its upstream end to its downstream end, with the approximate length of each section in parentheses: a feed section (6 D); a compression section (2.3 D); a first metering section (2.3 D); a venting section (4.5 D); a second metering section (5 D); a high pressure seal (1 D); a gas injection section (1 D); and a mixing section with large slotted flights for mixing (5.7 D) and unslotted flights to build pressure (2 D).

A profile die was fixed to the downstream end of the barrel. The die had a width of 100 mm, a height of 10 mm, and a gap thickness of about 0.5 mm.

The system was run under the following conditions. A filled, non-plasticized PVC formulation (density=1.46 g/cm$^3$) including a lubricant package was used. Nitrogen gas was used as the blowing agent. The mass flow rate was measured as 82 kg/hr. The pressure immediately after the blowing agent port was measured using a pressure transducer as 123 bar (1830 psi). The pressure at the end of the extruder was measured using a pressure transducer as 255 bar (3800 psi). The temperature of the polymer melt stream was measured using a pressure transducer as 193° C. (380° F.).

The product extruded uniformly from the die exit and was observed to foam upon exit from the die. The uniformity of flow and the foaming appearance was indicative of the uniform dispersion of the blowing agent in the polymer and the formation of a single-phase solution of polymer and blowing agent in the extruder. The extrudate was calibrated to desired dimensions using standard dry calibration technology. The profile was then measured to have an average density of 1.31 g/cm$^3$, a reduction of 10% from the solid plastic. SEM analysis of the cross-section of the extrudate indicated that the foam was microcellular material having an average cell size of between 35 and 45 microns.

Having described several embodiments and an example of the invention in detail, various modifications and improvements will readily occur to those skilled in the art. Such modifications and improvements are intended to be within the spirit and the scope of the invention. Furthermore, those skilled in the art would readily appreciate that all parameters listed herein are meant to be exemplary and that actual parameters will depend upon the specific application for which the system of the present invention is used. Accordingly, the foregoing description is by way of example only and is not intended as limiting. The invention is limited only as defined by the following claims and their equivalents.

What is claimed is:

1. A polymer processing apparatus comprising:
   an extruder having a barrel constructed to house a pair of twin polymer processing screws mounted therein, the extruder constructed and arranged to drive the screws counter-rotationally and to convey polymeric material within a polymer processing space in a downstream direction; and
   a blowing agent injection port fluidly communicating with the barrel and connectable to a source of blowing agent for introducing a blowing agent into the polymeric material in the polymer processing space,
   wherein the polymer processing screws include a blowing agent injection section having a series of full, unbroken flights, the blowing agent injection section being positioned adjacent the blowing agent injection port when the polymer processing screws are mounted within the barrel, and the full, unbroken flights are arranged to periodically block the blowing agent injection port as the polymer processing screws rotate within the barrel.

2. The polymer processing apparatus of claim 1, wherein each polymer processing screw includes a mixing section positioned downstream of the blowing agent injection port when the screws are mounted within the barrel.

3. The polymer processing apparatus of claim 2, wherein the mixing section includes a plurality of slotted flights designed to promote mixing of the polymer and blowing agent.

4. The polymer processing apparatus of claim 3, wherein the mixing section includes a plurality of full flights downstream of the slotted flights constructed to build pressure within the polymeric material therein.

5. The polymer processing apparatus of claim 1, further comprising a restriction element upstream of the blowing agent injection port constructed to restrict upstream flow of polymeric material therepast.

6. The polymer processing apparatus of claim 5, wherein the restriction element comprises a blister on at least one of the polymer processing screws.

7. The polymer processing apparatus of claim 5, wherein the restriction element comprises a reverse screw flight on at least one of the polymer processing screws.

8. The polymer processing apparatus of claim 1, further comprising at least one additional blowing agent injection port fluidly communicating with the barrel and connectable to a source of blowing agent for introducing a blowing agent into the polymeric material in the polymer processing space.

9. The polymer processing apparatus of claim 8, wherein the at least one additional blowing agent injection port is connected to the source of blowing agent.

10. The polymer processing apparatus of claim 1, wherein the blowing agent injection port includes a plurality of orifices which fluidly connect the source of blowing agent to the polymeric material in the polymer processing space.

11. The polymer processing apparatus of claim 1, wherein the blowing agent source comprises an atmospheric gas.

12. The polymer processing apparatus of claim 11, wherein the blowing agent source comprises carbon dioxide.

13. The polymer processing apparatus of claim 11, wherein the blowing agent source comprises nitrogen.

14. The polymer processing apparatus of claim 1, wherein the apparatus is constructed and arranged to produce a microcellular material.

15. The polymer processing apparatus of claim 1, wherein the blowing agent injection port is connected to the source of blowing agent.

16. The polymer processing apparatus of claim 1, wherein the blowing agent injection port is formed in the barrel.

* * * * *

UNITED STATES PATENT AND TRADEMARK OFFICE
CERTIFICATE OF CORRECTION

PATENT NO. : 6,602,064 B1
DATED : August 5, 2003
INVENTOR(S) : Chen et al.

It is certified that error appears in the above-identified patent and that said Letters Patent is hereby corrected as shown below:

<u>Title page,</u>
Item [75], Inventors, replace "Ligin Chen" with -- Liqin Chen --.

<u>Column 1,</u>
Line 48, prior to "degradation," insert -- Though the above-described qualities make counter rotating twin screw extruders desirable for processing polymeric materials that are shear sensitive and subject to harmful --

Signed and Sealed this

Eleventh Day of May, 2004

JON W. DUDAS
*Acting Director of the United States Patent and Trademark Office*